US008904624B2

(12) United States Patent
Berger et al.

(10) Patent No.: US 8,904,624 B2
(45) Date of Patent: Dec. 9, 2014

(54) MACHINE WITH A SUPPORTING FRAMEWORK FOR HOLDING A COVERING

(75) Inventors: Thomas Berger, Glashütten (DE); Eberhard Sendobry, Rimbach (DE)

(73) Assignee: KHS GmbH, Dortmund (DE)

( * ) Notice: Subject to any disclaimer, the term of this patent is extended or adjusted under 35 U.S.C. 154(b) by 320 days.

(21) Appl. No.: 13/255,679

(22) PCT Filed: Aug. 26, 2010

(86) PCT No.: PCT/EP2010/005232
§ 371 (c)(1),
(2), (4) Date: Sep. 9, 2011

(87) PCT Pub. No.: WO2011/023388
PCT Pub. Date: Mar. 3, 2011

(65) Prior Publication Data

US 2011/0316404 A1 Dec. 29, 2011

(30) Foreign Application Priority Data

Aug. 31, 2009 (DE) ......................... 10 2009 038 811

(51) Int. Cl.
*B23P 11/00* (2006.01)
*B67C 3/22* (2006.01)

(52) U.S. Cl.
CPC ........................................ *B67C 3/22* (2013.01)
USPC .......................................... 29/557; 312/351.1

(58) Field of Classification Search
CPC ................ E04C 2003/0413; E04C 2003/0421; E04C 2003/043; E04C 3/09; E04B 1/2608; E06B 3/67304; E06B 3/267; B21D 53/74; Y10S 49/01
USPC ............................ 29/897.3, 897.31, 897.312, 29/897.33–897.35, 525.01; 52/241, 242, 52/769
See application file for complete search history.

(56) References Cited

U.S. PATENT DOCUMENTS

| | | | | | |
|---|---|---|---|---|---|
| 3,256,030 | A * | 6/1966 | Banse | | 403/400 |
| 3,908,328 | A * | 9/1975 | Nelsson | | 52/769 |
| 4,513,557 | A * | 4/1985 | Wendt | | 52/489.1 |
| 5,201,120 | A * | 4/1993 | Patrick | | 29/897.31 |
| 6,209,268 | B1 | 4/2001 | Schmidt | | |
| 2004/0103617 | A1* | 6/2004 | Eder | | 53/235 |
| 2006/0283145 | A1 | 12/2006 | Weisgerber et al. | | |
| 2009/0071104 | A1 | 3/2009 | Fischer | | |

FOREIGN PATENT DOCUMENTS

| | | |
|---|---|---|
| DE | 19914164 | 10/2000 |
| DE | 10210482 | 8/2003 |
| DE | 102004017737 | 11/2005 |
| DE | 102005012507 | 9/2006 |
| DE | 102005017957 | 10/2006 |
| EP | 1040978 | 10/2000 |
| FR | 2688295 | 9/1993 |
| WO | 02/051706 | 7/2002 |
| WO | 2004/113175 | 12/2004 |

* cited by examiner

*Primary Examiner* — Alexander P Taousakis
*Assistant Examiner* — Lee A Holly
(74) *Attorney, Agent, or Firm* — Occhiuti & Rohlicek LLP

(57) ABSTRACT

A method of making a supporting framework for holding a covering for a container-treatment machine that includes a machine element that is at least partially covered by the covering, and in which columns and cross members are connected to one another in a centering manner at node points includes equipping a column with a connecting flange. This connecting flange is folded relative to a non-folded lug. The connecting flange centers the column relative to a cross-member.

21 Claims, 5 Drawing Sheets

MACHINE WITH A SUPPORTING FRAMEWORK FOR HOLDING A COVERING

CROSS-REFERENCE TO RELATED APPLICATIONS

This application is the National Stage of International Application No. PCT/EP2010/005232, filed on Aug. 26, 2010, which claims the benefit of the priority date of German Patent Application No. 10 2009 038 811.7, filed on Aug. 31, 2009. The contents of both applications are hereby incorporated by reference in their entirety.

FIELD OF INVENTION

The invention relates to a machine, in particular a container treatment machine, having a machine element and an associated covering that completely or partially encloses the machine element.

BACKGROUND

Machines, and in this instance container treatment machines, broadly serve to fill and/or clean containers, label them, cap them etc. Within the scope of the present invention, the term "container treatment machine" also refers to machines for the mixing of liquids, for the cleaning of containers, for the pasteurizing of products or of containers filled with product, for the emptying and/or cleaning and/or filling and/or capping of metal or plastic drums, for the packing of containers or groups of containers, for the carbonizing of liquids, for the inspection of open or closed containers, and for the stretch blow molding of containers.

Today, filling is usually carried out under sterile conditions, in particular in the food industry, as is described in DE 10 2005 012 507 A1. For this purpose, the prior art disclosure refers by way of example to a bottle store that is encapsulated with a wall. This arrangement is intended to keep warm air, which leaves a blow molding machine, or which is produced by the heat of the bottles, around the bottles. The wall may be constructed, for example, of metal, plastic, glass or a similar material in order to encapsulate the warm air. Heat-insulating material may also be employed at this location.

DE 10 2004 017 737 A1 also discloses a cycling carousel filling machine. In this case too, sterile filling conditions apply and an enclosure is again realized that represents a barrier to bacteria and spores.

Apart from these previously documented container treatment machines that have at least one associated covering, in particular, for the sterile treatment of containers, numerous other container treatment machines exist in practice. These container treatment machines, for aesthetic reasons, for example, are equipped with such coverings, usually made of glass. In the past, the usual approach has been for machine and covering, or the machine element to be enclosed and its associated covering, to always be developed, manufactured and sold together. This approach is costly and prevents standardization.

SUMMARY

The invention is based on the technical problem of further developing such a machine, in particular a container treatment machine, to the extent that individual or all machine elements can be enclosed simply and inexpensively and that opportunities for standardization are also provided.

To solve this technical problem, a generic machine is disclosed, in particular a container treatment machine within the scope of the invention, characterized in that a supporting framework consisting of columns and cross-members that are interconnected in a centering manner at node points is provided for holding the covering. This means that the invention does not expressly make use of mountings, booms etc., which have to be especially attached to the machine element that is to be enclosed in order for the covering to be fastened thereto. Instead, the invention makes use of a usually self-supporting framework that consists of columns and cross-members interconnected in a centering manner at node points, and that is provided and intended to hold the covering. This means that the supporting framework is usually dimensioned and designed so that it carries the covering alone, without the machine element to be covered, i.e. that it is self-supporting in design.

According to an advantageous embodiment, this is achieved by equipping a column with at least one connecting flange that is folded relative to a non-folded lug and that serves the combined purposes of centering relative to, and coupling with, the cross-member. This means that the column initially has a folded connecting flange. This connecting flange is manufactured from the column by being folded relative to the column, i.e. by normally being folded back by an angle of approximately 90°. This folding operation to produce the connecting flange leaves behind a non-folded lug of the column, i.e. a column component that is not folded. After the folding operation, this column component defines the aforementioned non-folded lug.

The procedure involves defining the connecting flange on the column concerned by making a cut into the column, preferably on its edge. This produces a column cut-out in the column that is defined or can be defined by a cut into the column edge. A laser cut has proven to be a favorable way to achieve this, i.e. an incision in the material made with a laser, in particular a CO2 laser. The column cutout so produced, which is still connected in one piece to the column along at least one edge or along an excluding folding line, is now folded relative to the column. This folding takes place along the folding line that runs along the edge by which the column cutout is still connected in one piece to the column.

Specifically, the column cutout is folded back along the folding line concerned or along the edge, or more precisely, along the connecting edge that is between the column cutout and the rest of the column, recessing the previously mentioned non-folded lug. In detail, this can be realized in such a way that a flange cutout is in turn defined in the column cutout. This flange cutout does not follow the folding motion of the column cutout to create the connecting flange. In this way the flange cutout forms the non-folded lug. This means that the non-folded lug and the rest of the column are unaffected by the folding process.

Instead of equipping the column with the folded back connecting flange and the non-folded lug, the reverse can be done, in which case the cross-member is equipped with the folded-back connecting flange and the lug, and in which the column has at least one recess that the lug engages in a centering manner. In either case, the connecting flange and the non-folded lug ensure a combined centering and coupling between column and cross-member.

The column is usually U-shaped in cross-section. In these cases, one or both U-legs define one or both connecting flanges. Two connecting flanges are normally provided, with one connecting flange on each U-leg. The design is also selected so that the two connecting flanges have the same length and width and are, in most cases, located or defined at the end of the column. In this way it is possible to manufacture columns of any desired length, whereby the connecting flanges in conjunction with the associated non-folded lugs can easily be defined at almost any point on the column, but usually at its end.

To achieve this, it is merely necessary to equip the column with the mentioned column cutout and equip the latter in turn with the flange cutout. As soon as the column cutout is folded back, not only the connecting flange but also the non-folded lug is available. The connecting flange usually serves for connecting with the cross-member. For this purpose the invention makes use of, for example, connecting means that penetrate the connecting flange and the cross-member together, for example bolts, rivets, clips etc.

At the same time, the lug on the column, which usually engages a recess in or on the cross-member on the column, provides the necessary centering between column and cross-member. In fact the configuration is usually designed so that when the lug is engaged in the recess, the column and the cross-member are aligned perpendicular to one another at the node point thus created. Other angular arrangements between column and cross-member are also possible within the scope of the invention.

The configuration is usually selected so that the two lugs per column cutout or per folded connecting flange are disposed in line one after the other in the longitudinal extension of the column. Consequently the corresponding two recesses in the cross-member to receive the respective lug are aligned in the transverse direction. As a result, the interplay between the two lugs and the two associated recesses ensures achievement of the previously mentioned perpendicular arrangement after the centering and coupling of cross-member and column. In any event the one lug or the two lugs on the column engages or engage in a centering manner the one or the two corresponding recesses in or on the cross-member. It is only once this engagement is complete that the column and the cross-member are then coupled to one another through the previously mentioned connecting means.

In this context it has also proven to be an advantage if a support surface is associated with the connecting flange on the column. This support surface is usually defined automatically in the course of the folding of the column cutout while forming the connecting flange. In other words, the support surface concerned appears by itself on the edge of the column cutout and comes into being when the column section concerned is folded back to form the connecting flange. The support surface serves as a bearing for the cross-member. Since the connecting flange is defined in the U-legs, two support surfaces that are aligned flush relative to one another appear after the associated column cutout is folded back. These two support surfaces act as bearings for the associated cross-member.

The cross-member can, for example, receive mountings that accept panes of glass, enclosing plates, cladding panels etc. made from all conceivable materials. The column too may be equipped with such mountings. In this way, the supporting framework can be adapted like a construction kit to accommodate very different requirements. It is particularly significant in this context that the supporting framework is configured to be self-supporting, i.e. that, for example, it encloses the machine element that is contained and housed within it totally or completely and without the machine element additionally assuming or having to assume supporting functions for the enclosure. The cross-members and/or the columns can also be manufactured and/or stocked in standard sizes.

Consequently a machine or container treatment machine is made available that is equipped or that can be equipped with a standardized covering. In this way, differently configured container treatment machines can be completely or partially enclosed as may be required. Fully enclosed and/or sealed coverings are also conceivable so that container treatment machines that operate in sterile conditions can also be equipped in this way. This is all achievable by the construction kit method solely by using the specially designed columns and cross-members. This is where the essential advantages are to be seen.

BRIEF DESCRIPTION OF THE DRAWINGS

The invention is explained more fully below by reference to the figures, in which.

DETAILED DESCRIPTION

Figure 1:
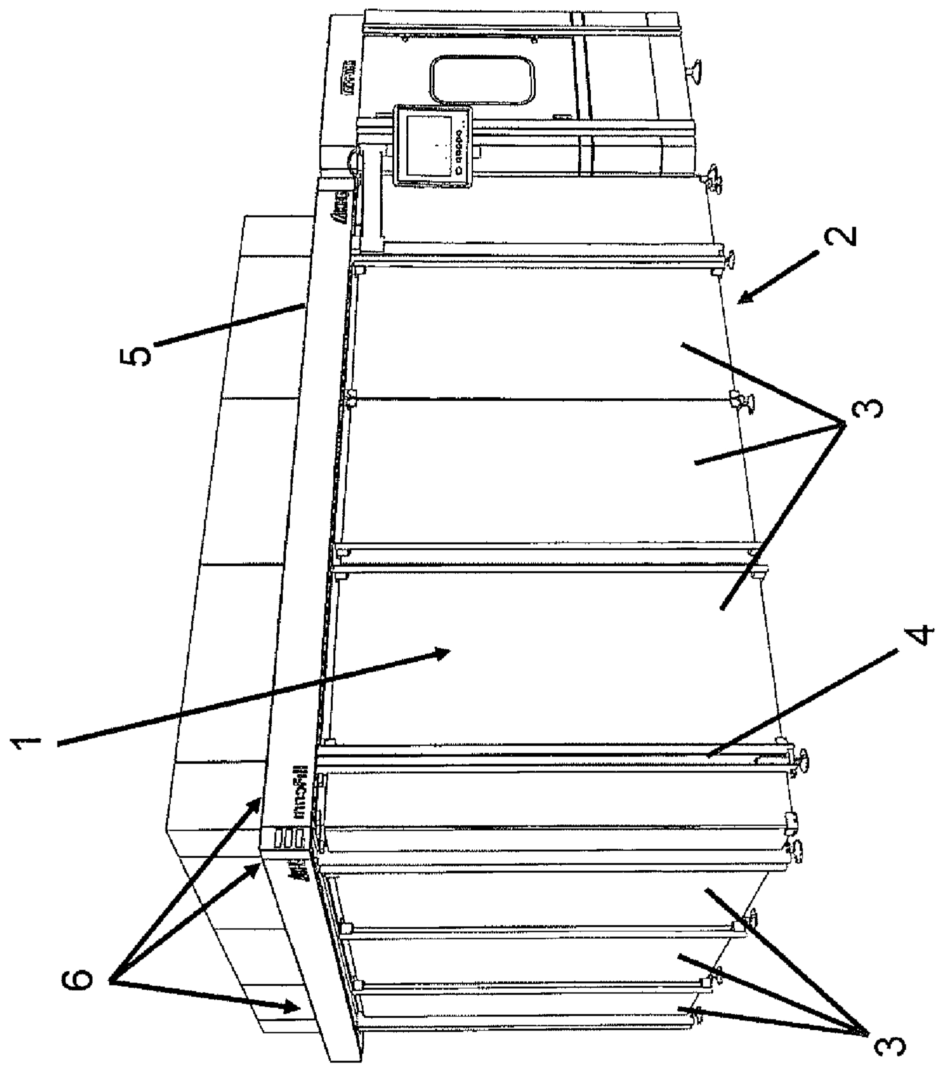
FIG. 1 shows a general overview of a container treatment machine.

The figures depict a machine, in particular a container treatment machine, which is not restricted to being a filling machine for bottles. The container treatment machine concerned is equipped with at least one machine element, in this instance with a carousel 1 for bottles or for containers generally. Other and completely differently configured machine elements 1 may also be used.

Machine element 1 is provided with an associated covering 2 composed of glass panes 3 that together fully enclose machine element 1. Covering 2 can also be configured in such a way that machine element 1 is only partially enclosed.

In order to define the covering 2 in detail and to realize the desired enclosing of machine element 1, there is provided a supporting framework comprising columns 4 and cross-members 5 interconnected in a centering manner at node points 6. In the depicted example, the covering 2 and the individual glass panes 3 are held in place and supported with the help of columns 4 and of cross-members 5. As already described above, the supporting framework is self-supporting.

Figure 2:
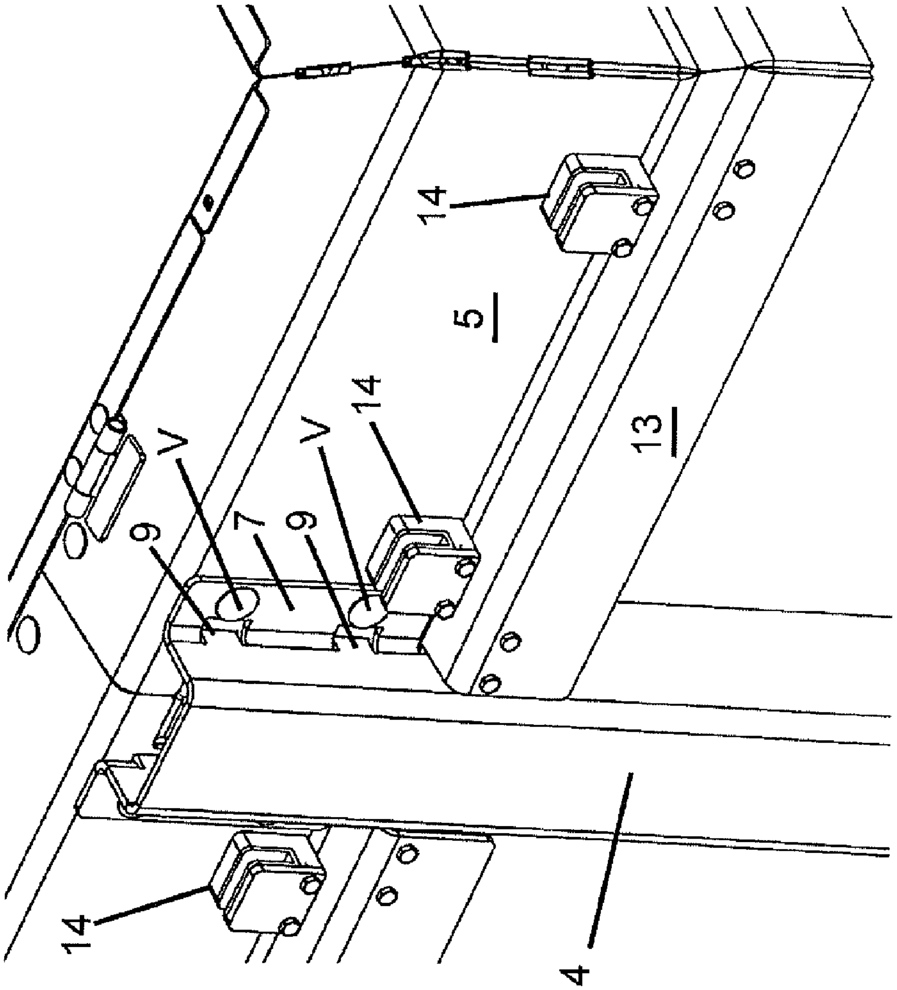
FIG. 2 shows a detail from FIG. 1 in the region of a node point between column and cross-member.
Figure 3:
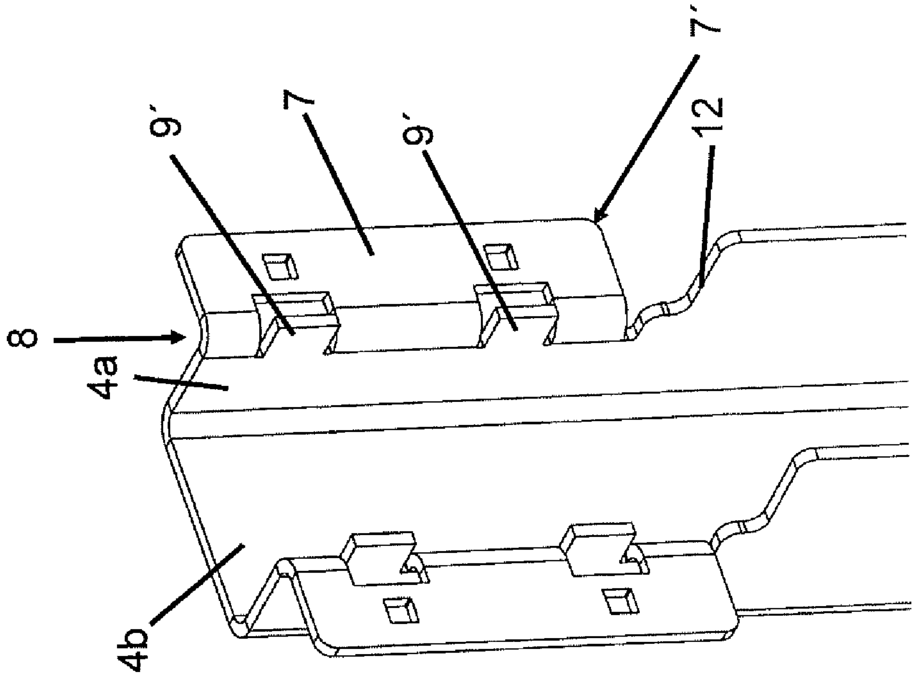
FIG. 3 shows the column in front view in the region of the node point
Figure 4:
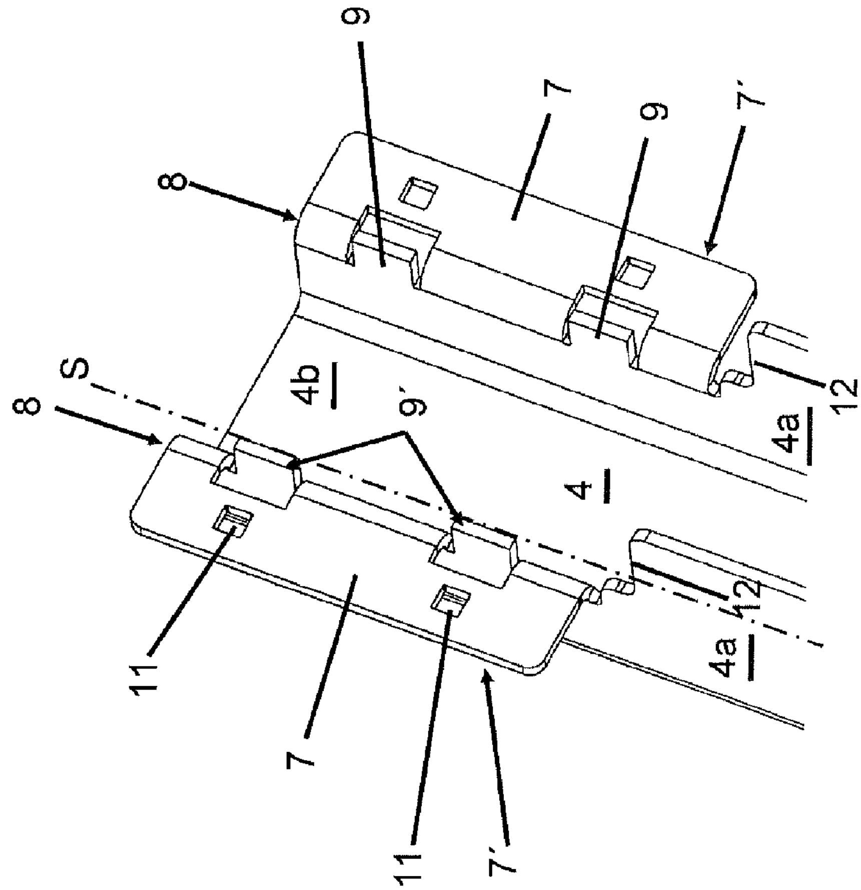
FIG. 4 shows the associated column in a rear view.

It can be seen from FIG. 2 and/or from a comparative consideration of FIGS. 3 and 4 that the respective column 4 is U-shaped in cross-section, providing two U-legs **4*a* and a U-base 4*b* as a result. The two U-legs 4*a* define two connecting flanges 7. The two connecting flanges 7 are manufactured from the respective U-legs 4*a*, or more precisely, from the column 4 as a whole. For this purpose, a cut is made into the edge of column 4 and/or of associated U-legs 4*a*, this being advantageously effected with the use of a laser that is also otherwise used for blanking. In this way there is initially defined a column cutout 7' that remains connected to column 4 or to the latter's U-base 4*b* or more precisely U-legs 4*a* in one piece. This column cutout 7' is folded back relative to column 4, thus forming the connecting flange 7. It can be seen that, for this purpose, the column cutout 7' is bent back along a folding line 8 by approximately 90° relative to the associated U-leg 4*a* that defines it. At the same time, the folding line 8 represents a folding edge along which the flange cutout 7'** remains connected by its base and in one piece to column 4 or more precisely to the associated U-leg 4*a*.

A flange cutout 9' is also defined in the column cutout 7'. This is again made by a laser cut, laser blanking, or more precisely, by laser incision. This flange cutout 9' does not follow the folding motion of column cutout 7'. This means that flange cutout 9' extends unchanged in the direction of the associated U-leg 4*a*, that, in its entirety, constitutes a part of U-leg 4*a*, and that is unaffected by the folding motion that is executed to produce connecting flange 7. Consequently, after the folding motion that is executed to produce the connecting flange 7 from the column cutout 7', the flange cutout 9' defines a lug 9 that is not folded relative to the connecting flange 7.

Figure 5:
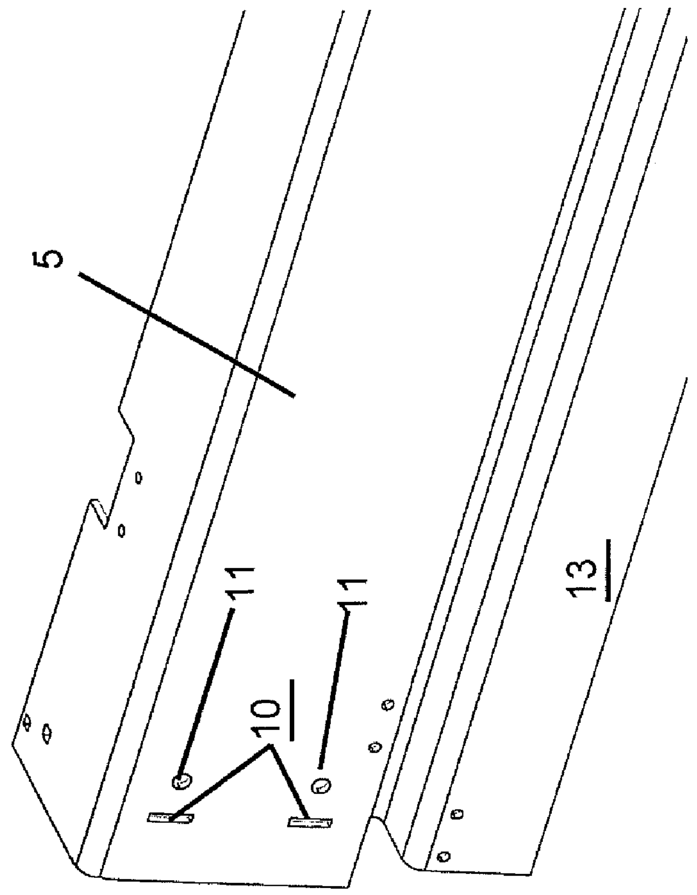
FIG. 5 shows a cross-member in the region of the node point.

Within the scope of the embodiment, two non-folded lugs 9 are provided per folded connecting flange 7 and/or per column cutout 7'. These two lugs 9 extend in the longitudinal extension of the column 4, or more precisely, are disposed in the longitudinal extension of an associated U-leg 4*a*. There are, in fact, two connecting flanges 7 with two associated non-folded lugs 9 that, relative overall to a longitudinal axis of symmetry S of column 4, are disposed opposite one another and are executed identically and symmetrically. The respective lug 9 or two lugs 9 on the column 4 engages/engage corresponding recesses 10 in cross-member 5. As shown in FIG. 5, the associated recesses 10 in cross-member 5 extend transversely relative to cross-member 5.

Consequently as soon as a respective lug 9 engages a recess 5, the column 4 is centered relative to the cross-member 5. The design is configured in such a way that the column 4 and its associated cross-member 5 exhibit a predominantly perpendicular arrangement relative to one another. The column 4 and the cross-member 5 are interconnected in the course of this centering or thereafter. For this purpose, one or a plurality of connecting means V may engage holes 11 located to coincide with one another in the connecting flange 7, on the one hand, and in cross-member 5 on the other.

A support surface 12 is formed on the column 4 in the course of defining the column cutout 7'. This support surface 12 comes into being automatically when the cut is made into the column 4 or the associated U-leg 4*a* to form column cutout 7'. As soon as the column cutout 7' is folded back while producing the connecting flange 7, the support surface 12 is formed automatically. In fact, two support surfaces 12 lying opposite the longitudinal axis of symmetry S are formed as mirror images of one another and that together act as bearings for cross-member 5. For this purpose, cross-member 5 is provided with a fold 13 that rests on the support surface 12 in question.

Finally, the cross-member 5 can be seen to exhibit a number of mountings 14 that serve to receive glass panes 3 in this illustrative case, or enclosing plates or cladding panels. The column 4 and the cross-member 5 are generally produced as channel sections made of metal. However, production from plastic is also possible.

Having described the invention, and a preferred embodiment thereof, what is new and secured by Letters Patent is:

1. A method of making a supporting framework for holding a covering for a container-treatment machine that comprises a machine element that is at least partially covered by said covering, wherein columns and cross members are connected to one another in a centering manner at node points, said method comprising equipping a column with a connecting flange, wherein said connecting flange is folded relative to a non-folded lug, and using said connecting flange, centering said column relative to a cross-member, wherein said non-folded-lug extends along a first direction, wherein said connecting flange extends along a second direction, and wherein said first direction and said second direction are different directions.

2. The method of claim 1, further comprising defining said connecting flange on a column by making a cut into a side of said column, and folding back a column cutout thus created relative to said column while said column cut-out remains connected to said column so that said column cut-out and said column remain one piece.

3. The method of claim 2, further comprising making a flange cutout within said column cutout, and folding said connecting flange along said flange cutout while leaving behind a non-folded lug that does not follow a folding motion of said connecting flange.

4. The method of claim 3, wherein folding said connecting flange along said flange cutout comprises forming a support surface.

5. The method of claim 4, wherein said support surface is oriented to support a load that is applied along a direction that is different from a direction of a vector normal to said connecting flange.

6. The method of claim 5, further comprising causing said support surface to support said cross-member.

7. The method of claim 6, wherein causing said support surface to support said cross-member comprises causing a fold in said cross-member to rest on said support surface.

8. The method of claim 1, further comprising causing said first and second directions to be perpendicular to each other.

9. The method of claim 1, further comprising causing said non-folded lug to engage a recess in said cross-member.

10. The method of claim 1, wherein, as a result of having been folded relative to said non-folded lug, a surface normal vector of said connecting flange and a surface normal vector of said non-folded lug are not parallel.

11. A method of making a supporting framework for holding a covering for a container-treatment machine that comprises a machine element that is at least partially covered by said covering, wherein columns and cross members are connected to one another in a centering manner at node points, said method comprising equipping a column with a first connecting flange, equipping said column with a second connecting flange, and using said first and second connecting flanges, centering said column relative to a cross-member, wherein said first connecting flange is folded relative to a first non-folded lug, wherein said second connecting flange is folded relative to a second non-folded lug, wherein said first non-folded-lug extends along a first plane, wherein said first connecting flange extends along a second plane, wherein said second non-folded-lug extends along a third plane, wherein said second connecting flange extends along a fourth plane, wherein said first plane and said second plane are different planes, wherein said third plane and said fourth plane are different planes.

12. The method of claim 11, further comprising selecting said first plane and said third direction to be parallel planes.

13. The method of claim 11, further comprising selecting said first plane and said fourth plane to be coplanar.

14. The method of claim 11, further comprising selecting said first plane and said second plane to be non-coplanar.

15. The method of claim 11, further comprising selecting said first plane and said second plane to be non-coplanar, selecting said third plane and said fourth plane to be non-coplanar, selecting said first plane and said fourth plane to be coplanar, and selecting said first plane and said third plane to be parallel.

16. The method of claim 11, further comprising selecting said first plane and said second plane to be orthogonal.

17. The method of claim 11, further comprising selecting said first plane and said second plane to be non-coplanar, selecting said third plane and said fourth plane to be non-coplanar, selecting said first plane and said fourth plane to be coplanar, selecting said first plane and said third plane to be parallel, selecting said first plane and said second plane to be orthogonal, and selecting said third plane and said fourth plane to be orthogonal.

18. The method of claim 11, further comprising defining said first connecting flange on a column by making a first cut into a first side of said column, and folding back a first column cutout thus created relative to said column, and defining said second connecting flange on said column by making a second cut into a second side of said column, and folding back a second column cutout thus created relative to said column, whereby said first column cut-out remains connected to said column, whereby said second column cut-out remains connected to said column, and whereby said first column cut-out, said second column-cutout, and said column remain one piece.

19. The method of claim 18, wherein folding back said first column cutout comprises folding said first column cutout by rotating said first column cutout in a first direction, wherein folding back said second column cutout comprises folding said second column cutout by rotating said second column cutout in a second direction, and wherein said first direction is opposite to said second direction.

20. The method of claim 19, further comprising making a flange cutout within said first column cutout, folding said first connecting flange along said first flange cutout while leaving behind a first non-folded lug that does not follow a folding motion of said first connecting flange, making a flange cutout within said second column cutout, and folding said second connecting flange along said flange cutout while leaving behind a second non-folded lug that does not follow a folding motion of said second connecting flange.

21. The method of claim 20, wherein folding said first connecting flange comprises forming a first support surface, and folding said second connecting flange comprises forming a second support surface, wherein said first support surface is level with said second support surface.

* * * * *